(12) United States Patent
Deutsch et al.

(10) Patent No.: US 8,825,816 B2
(45) Date of Patent: Sep. 2, 2014

(54) VARIOUS METHODS AND APPARATUSES FOR A CENTRAL MANAGEMENT STATION FOR AUTOMATIC DISTRIBUTION OF CONFIGURATION INFORMATION TO REMOTE DEVICES

(75) Inventors: Jonathan Peter Deutsch, Yorba Linda, CA (US); Danny Te-An Sung, Rancho Santa Margarita, CA (US)

(73) Assignee: Lantronix, Inc., Irvine, CA (US)

( * ) Notice: Subject to any disclaimer, the term of this patent is extended or adjusted under 35 U.S.C. 154(b) by 85 days.

(21) Appl. No.: 12/306,069

(22) PCT Filed: Oct. 24, 2008

(86) PCT No.: PCT/US2008/081181
§ 371 (c)(1),
(2), (4) Date: May 21, 2010

(87) PCT Pub. No.: WO2009/055716
PCT Pub. Date: Apr. 30, 2009

(65) Prior Publication Data
US 2012/0284374 A1 Nov. 8, 2012

Related U.S. Application Data

(60) Provisional application No. 60/982,388, filed on Oct. 24, 2007.

(51) Int. Cl.
*G06F 15/177* (2006.01)
*G06F 15/173* (2006.01)

(52) U.S. Cl.
USPC .............................. 709/221; 709/220; 709/225

(58) Field of Classification Search
USPC ................................................. 709/220, 221
See application file for complete search history.

(56) References Cited

U.S. PATENT DOCUMENTS 6,631,416 B2   10/2003   Bendinelli
6,779,004 B1 *  8/2004   Zintel ........................... 709/227

(Continued)

FOREIGN PATENT DOCUMENTS

JP   2004501534 A   1/2004
JP   2005277498 A   6/2005

(Continued)

OTHER PUBLICATIONS

Hori, K et al, "Auto-Configuration Method of Provisioning System for Internet VPNS", IEICE Transactions on Communications, Communications Society, Sep. 1, 2006, pp. 2424-2433, vol. E89B, No. 9, Tokyo, Japan.

(Continued)

*Primary Examiner* — John B. Walsh
(74) *Attorney, Agent, or Firm* — Rutan & Tucker, LLP; Hani Z. Sayed

(57) ABSTRACT

A method, apparatus, and system are described for a central management system to configure remote devices. A device service manager server (DSM) may have an IP redirector module configured to cooperate with two or more device service controllers (DSCs) that are behind a firewall on a wide area network relative to a location of the DSM on the wide area network, where the DSM serves as a central management station for a distribution of initial configuration information to the DSCs, wherein an executable boot up file uploaded via a drive port in that DSC is scripted to gather configuration information for that DSC and network devices on the same network as that DSC and without a prompt by the DSM then sends configuration files to the DSM which makes a master copy of the device configuration file in the DSM's registry for that DSC.

22 Claims, 9 Drawing Sheets

(56) References Cited

U.S. PATENT DOCUMENTS

| | | | |
|---|---|---|---|
| 7,272,613 | B2 | 9/2007 | Sim |
| 2002/0029276 | A1 | 3/2002 | Bendinelli |
| 2003/0018889 | A1 | 1/2003 | Burnett |
| 2005/0198233 | A1* | 9/2005 | Manchester et al. .......... 709/221 |
| 2006/0195568 | A1* | 8/2006 | Staurnes et al. ............. 709/224 |
| 2006/0242695 | A1 | 10/2006 | Nedeltchev |
| 2007/0233845 | A1* | 10/2007 | Song et al. .................... 709/223 |
| 2008/0019367 | A1* | 1/2008 | Ito et al. ......................... 370/392 |
| 2009/0052675 | A1* | 2/2009 | Levow et al. ................. 380/278 |

FOREIGN PATENT DOCUMENTS

| | | |
|---|---|---|
| JP | 2007049499 A | 2/2007 |
| WO | WO2007004755 A1 | 1/2007 |

OTHER PUBLICATIONS

"Dynamic Multipoint VPN (DM VPN)", Cisco IOS Security Configuration Guide, Dec. 11, 2006, San Jose, California, URL:http://www.cisco.com/univercd/cc/td/doc/product/software/io122/122newft/122t/122t13/ftfreips.pdf.

J. Rosenberg, Cisco Systems; R. Mahy, Plantronics; C. Huitema, Microsoft; "Traversal Using Relays around NAT (TURN): Relay Extensions to Session Traversal Utilities for NAT (STUN)", draft-ietf-behave-turn-04-txt, Behave, Internet-Draft, Jul. 8, 2007.

Cedric De Launois, et al., "Connection of Extruded Subnets: A Solution Based on RSIP", Evolution of Internet Architecture and Protocols, IEEE Communications Magazine, Sep. 2002, pp. 116-121, vol. 40, No. 9.

Ng, Eugene T.S. et al., "A Waypoint Service Approach to Connect Heterogeneous Internet Address Spaces", USENIX Annual Technical Conference, Jun. 1, 2006, Boston, MA, URL:http://www.cs.cmu.edu/eugeneng/papers/aves-paper.pdf.

"Program for Exporting Transmission Control Protocol-Based Services through Firewalls", IBM Technical Disclosure Bulletin, XP-000754125, Dec. 1997, pp. 161-162, vol. 40, No. 12.

Suzuki, Hidekazu, et al., "External Dynamic Mapping Method for NAT Traversal", 2007 International Symposium on Communications and Information Technologies (ISCIT), IEEE Communications Magazine, Oct. 1, 2007, pp. 723-728.

* cited by examiner

VARIOUS METHODS AND APPARATUSES FOR A CENTRAL MANAGEMENT STATION FOR AUTOMATIC DISTRIBUTION OF CONFIGURATION INFORMATION TO REMOTE DEVICES

CROSS REFERENCE TO RELATED APPLICATION

This application is related to and claims priority from the U.S. PCT Patent Application No. PCT/2008/081181 filed on Oct. 24, 2008, which claims priority to U.S. Provisional patent application Ser. No. 60/982,388, filed on Oct. 24, 2007.

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office Patent file or records, but otherwise reserves all copyright rights whatsoever.

FIELD OF THE INVENTION

Embodiments of the invention generally relate to network devices. More particularly, an aspect of an embodiment of the invention relates to a central management station for automatic distribution of configuration information to remote devices.

BACKGROUND OF THE INVENTION

The Internet is a large collection of networks that collectively use the TCP/IP protocol suite to allow devices on one network to automatically communicate with other devices that may be on the same or remote networks. Each such device is assigned an IP address for each active network interface, which allows network infrastructure components to automatically route traffic between target devices.

It is a general requirement that each such network interface be assigned an IP address that is unique across the entire Internet, although several blocks of IP addresses have been reserved for use on interfaces that do not need to be made available outside the local network. Such private addresses are also referred to as "non-routable" addresses because it is not possible to establish a route (that is, a path through a set of network infrastructure devices) such that traffic from a device on the local network may reach a network interface with the non-routable address on a remote network. As the Internet has grown, this technique has allowed the repeated reuse of private addresses, which has helped to alleviate a growing shortage of publicly accessible IP addresses, but it has also lead to greater complexity as administrators sought alternative mechanisms to provide access to remote devices without routable addresses.

As the Internet has grown and security threats have increased, network administrators have also sought to limit access to specific devices under their administrative control by developing and deploying network filtering devices or applications that allow network administrators to specify specific address and port combinations that are granted or denied access, as required. Together, these two techniques have helped ensure the growth and stability of the Internet, but at the cost of greatly increased complexity and cost for administrators wishing to provide seamless access to networked devices on networks outside their administrative control.

One existing mechanism to address this problem involves installing dedicated client software on a local networked device that would o allow it to function as part of a "virtual private network" (VPN), in which the local device is allowed to act as if it is a member of the remote network. When using such a VPN system the local host is assigned an IP address on the remote network and all traffic to and from hosts on the remote network is automatically routed by the VPN system.

This technique works but the approach suffers from several shortcomings. A VPN system must first be set up by the administrator of the remote network. Once that is done, specialized software must be installed on each external device that wishes access or the VPN system (if this is not done, the system will be capable of providing only limited accessibility, for example via a web browser interface). In addition, appropriate security credentials must be generated by the remote administrator and distributed and maintained by the local administrator and users, all of which places a significant administrative burden on all parties to the operation. As a final drawback, once a local host is granted VPN access, it will generally have access to all devices on the remote network, unless additional filtering steps are taken to prevent this, which may not be desired by the remote administrator.

Another technique to overcome the problems of non-routable addresses is to perform so-called "network address translation" (NAT), which involves complex reconfiguration of border routers to automatically map network address/port combinations to and from routable to non-routable addresses. This technique does allow the use of a single publically routable IP address to provide access to multiple devices with non-routable addresses but only at the cost of increased system complexity. NAT-enabled networks do not generally allow incoming connections unless mappings have been pre-configured from specific port/address combinations to specific devices, which may in turn conflict with software that attempts to use default or non-standard address/port combinations.

A major issue with each of these solutions is the challenge of setting initial configuration parameters, and updating or modifying system settings or parameters once equipment is placed into service in remote locations. This issue becomes more acute as the number of configured devices grows.

Given these challenges, there exists a need for a mechanism to allow simplified and automated configuration to remote devices without the use of dedicated hardware (such as laptops or local PC devices) or host software and without requiring network administrator privileges on the remote network to set up, maintain or operate the solution.

SUMMARY OF THE INVENTION

A method, apparatus, and system are described for a central management system to configure remote devices. A device service manager server (DSM) may have an IP redirector module configured to cooperate with two or more device service controllers (DSCs) that are on a wide area network (and possibly behind a firewall) relative to a location of the DSM on the wide area network, where the DSM serves as a central management station for a distribution of configuration information to the DSCs, wherein an administrator is able to create an executable boot up file that may be uploaded via a drive port into that DSC to automatically set initial device operating parameters that permit the system to become operational and contact the DSM for further operation and maintenance changes to the DSC's operating parameters. In addition, the DSC is capable of gathering operating and configuration information for that DSC and network devices on the same network as that DSC and without a prompt by the DSM either copy this to a local storage device, or \\send to the DSM which makes a master copy of the device configuration file in the DSM's registry for that DSC.

BRIEF DESCRIPTION OF THE DRAWINGS

The drawings refer to embodiments of the invention in which.

Figure 1:
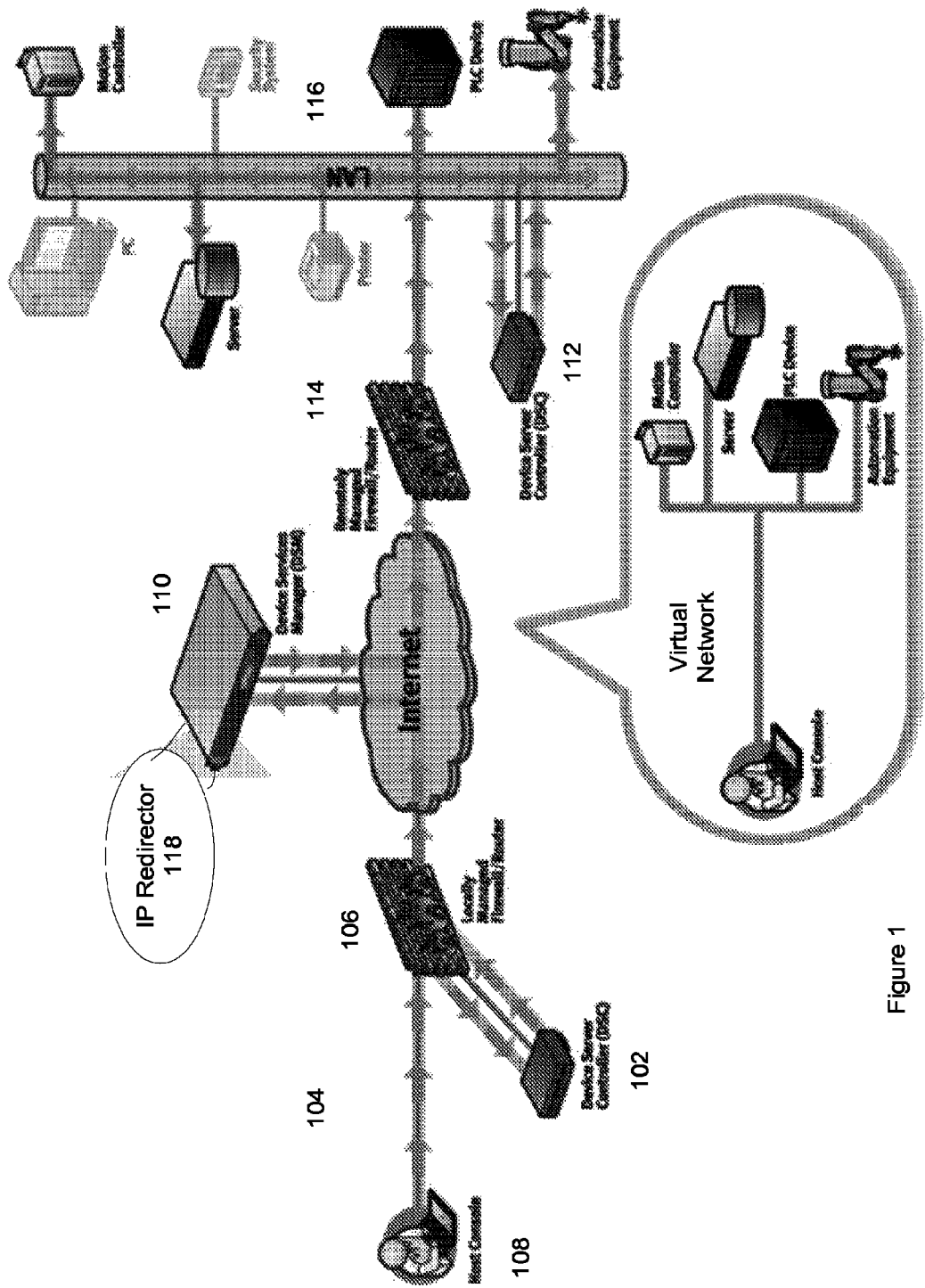
FIG. 1 illustrates a block diagram of an embodiment of a system to access to and from networked devices in networks protected by firewalls.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, networks, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Further specific numeric references such as first network, may be made. However, the specific numeric reference should not be interpreted as a literal sequential order but rather interpreted that the first network is different from a second network. Thus, the specific details set forth are merely exemplary. The specific details may be varied from and still be contemplated to be within the spirit and scope of the present invention.

In general, the various methods and apparatus are described to provide a central management system to configure remote devices. A device service manager server (DSM) may have an IP redirector module configured to cooperate with two or more device service controllers (DSCs) that each has a management module to manage an access module to proxy communications for networked devices behind a firewall on a wide area network relative to a location of the DSM on the wide area network. The DSM serves as a central management station for a distribution of configuration information to the DSCs. An executable boot up file in the DSC is scripted with code to determine a unique ID of that individual DSC device, to determine the DSC's current IP address, to supply the DSM's IP address on the wide area network, and to activate code to initiate communications with the DSM. A device configuration engine in the DSC without a prompt by the DSM then sends an initial configuration file with at least the unique ID of that individual. DSC device and the DSC's current IP address information via a secure communication channel to the supplied address of the DSM, and the IP redirector module receives this configuration information, cooperates with a user data replication manager module in the DSM to create a device configuration file with the initial configuration information and additional information and then makes a master copy of the device configuration file in the DSM's registry.

FIG. 1 illustrates a block diagram of an embodiment of a system to access to and from networked devices in networks protected by firewalls.

A first device service controller 102 (DSC) in a first network 104 protected by a first firewall 106. The first network 104 may contain a host console 108 associated with the first DSC 102. The host console 108 controls and manages a subset of equipment in a second network 116 protected by a second firewall 114. The second network 116 is located over the Internet from the first network 104 and the host controller 108. The first device service controller 102 in the first network 104 and a second device service controller 112 in a second network 116 cooperate with a device service manager server (DSM) 110 located on the Internet to provide highly secure remote access to the subset of equipment in the second network 116 through the firewalls 106, 114. The device service manager server 110 has an IP redirector program 118 containing code to perform machine-to-machine communications, via a direct communication tunnel, with each device service controller through the firewalls 106, 114. The subset of equipment in the second network 116 may for example, include a server, a PLC device, a motion controller, automation equipment, a printer, a security system and a personal computer.

In operation, the user from the host console 108 opens a connection to a designated port on a local DSC, i.e. the first DSC 102, operating in Host Controller Mode. This local DSC will accept the connection and hold the connection pending the establishment of a connection through to the target device. This local DSC will then initiate a connection to the controlling DSM 110, which will map the connection to a corresponding managed device IP address and port. The local DSC sends its identification information to successfully authenticate itself to the DSM 110. The associated DSC responsible for the target device, i.e. the second DSC 112, will periodically open a secure tunnel with the DSM 110 and determine if there is a pending connection. If there is a pending connection, the DSM 110 will instruct the DSC to initiate a proxy connection to the DSM 110, through which it will pass the traffic for the pending connection. The local DSC behind the firewall holds the direct communication tunnel with the DSM 110 open if there is a pending connection.

The direct communication tunnel between the first DSC 102 and the DSM 110 as well as the direct communication tunnel between the second DSC 112 and DSM 110 combine to allow secure access and management of equipment in a network protected by a firewall from a device external to the network protected by the firewall while maintaining a network's IT policy and the integrity of the network's firewall. The connection points to the first DSC 102 and the second DSC 112 are not publicly exposed outside their respective networks to devices external to their networks because the DSCs 102, 112 are located behind their respective firewall 106, 114 to increase security of the communications through the direct communication tunnel. When the local DSC successfully authenticates to the DSM 110, the DSC can immediately begin providing secure access to any device such as the PLC device, in the network that has been designated as visible to a participating DSC. The designated visible devices have been authorized by the user of the second network 116 to be published.

As discussed, visible associated devices have been authorized by the owner of that domain to be visible/published to the virtual device network VDN (i.e. the VDN includes the equipment in the first and second networks 104, 116 that have been authorized to be visible). The example subset of equipment in the second network authorized to have their information visibly published to the VDN include a server, a PLC device, a motion controller, and the automation equipment, while the printer, a security system and a personal computer have not been authorized by the user to be visible to the VDN.

The local DSC discovers the components within its network and presents the owner of that domain with a graphic user interface asking which network components the owner wishes to make visible/publish their information. The local DSC collects this information, stores this information, and sends the publish information to the DSM. The information can include the DSC's identifier and IP address, and each component's IP address, name, capabilities, protocols supported, etc, within that DSC's network.

Figure 5:
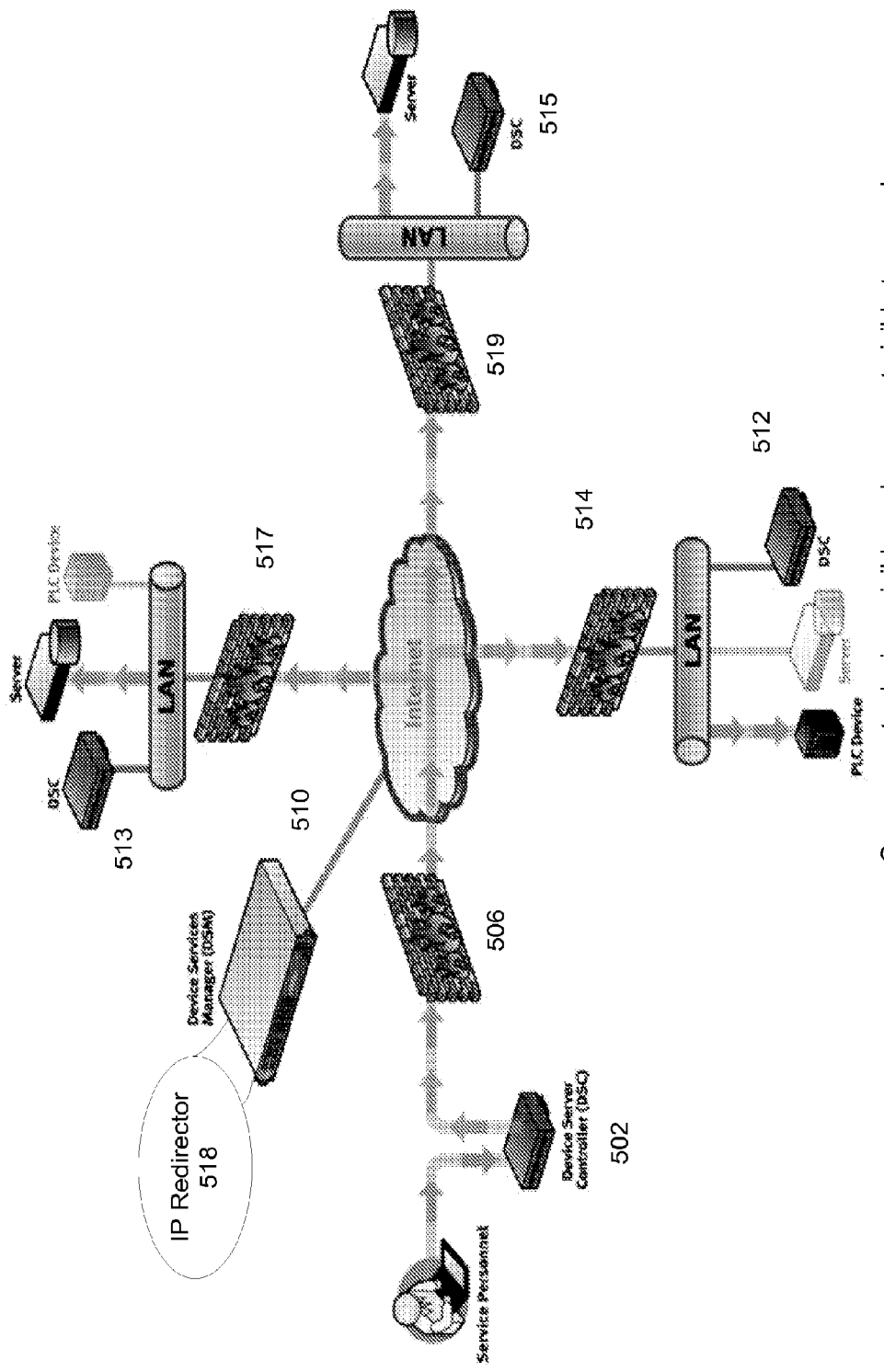
FIG. 5 illustrates a block diagram of an embodiment of an automated centralized administration of a distributed system.

FIG. 5 illustrates a block diagram of an embodiment of an automated centralized administration of a distributed system.

The heart of the system is the DSM 510. The Device Services Manager manages a collection of DSCs 502, 512, 513, and 515.

The DSM 510 may have an IP redirector module 518 configured to cooperate with the two or more DSCs 502, 512, 513, 515 that are behind a firewall, such as firewalls 506, 514, 517, and 519, on a wide area network relative to a location of the DSM 510 on the wide area network. The DSM 510 serves as a central management station for automatic distribution of configuration information to the DSCs 502, 512, 513, and 515. An executable boot up file uploaded via a drive port in that DSC is scripted to gather configuration information for that DSC and network devices on the same network as that DSC and without a prompt by the DSM 510 then sends an initial configuration file to the DSM 510. The DSM 510 makes a master copy of the device configuration file in the DSM's registry for that DSC.

Each DSC 502, 512, 513, 515 and the DSM 510 work in concert to provide end-to-end access between associated devices in different Domains. The DSM 510 serves as a proxy connection point for participating DSCs 502, 512, 513, 515. The DSM 110 is a dedicated appliance that relays connections between user hosts and destination devices.

Individual DSC 502, 512, 513, 515 serve as a low cost point of presence on participating LANs. Each DSC 502, 512, 513, 515 is capable of acting simultaneously as both a Host Controller (which originates connections from host systems) and a Device Controller (which receives and manages incoming connections to individual remote devices). Each DSC 502, 512, 513, 515 is configured to proxy connections for both itself and its associated network devices to its parent DSM 510 located beyond the local LAN.

To the remote network, a newly installed DSC functions like a newly installed computer. To access devices on a remote network, the DSC just needs to establish a single out-bound connection to the DSM controlling the VDN. The outbound connection is a conduit communication link between the DSC acting as a Host Controller and the DSM. Once this connection is established, all system configuration, commands and network traffic can pass through the encrypted channel. When the DSC successfully authenticates to the DSM, it can immediately begin providing secure access to individual pieces of pre-authorized equipment.

With no client software to install on a PC or local server by the user and no changes required to either the network configuration or application software at either end of the connection, the DSM and its participating DSCs provide a secure and totally transparent remote access solution. The DSC uploads the software via the local drive port and the rest is scripted by the executable file itself to do the rest.

Thus, the device service manager server 510 may cooperate with one or more device service controllers 502, 512, 513, 515 to manage 1,000's of associated network devices behind firewalls at locations all over the world—securely, through a central point of contact. Each device service controller 502, 512, 513, 515 is configured to connect and manage individual pieces of equipment located behind a firewall and itself is located behind the firewall relative to the location of device service manager server.

Figure 8:
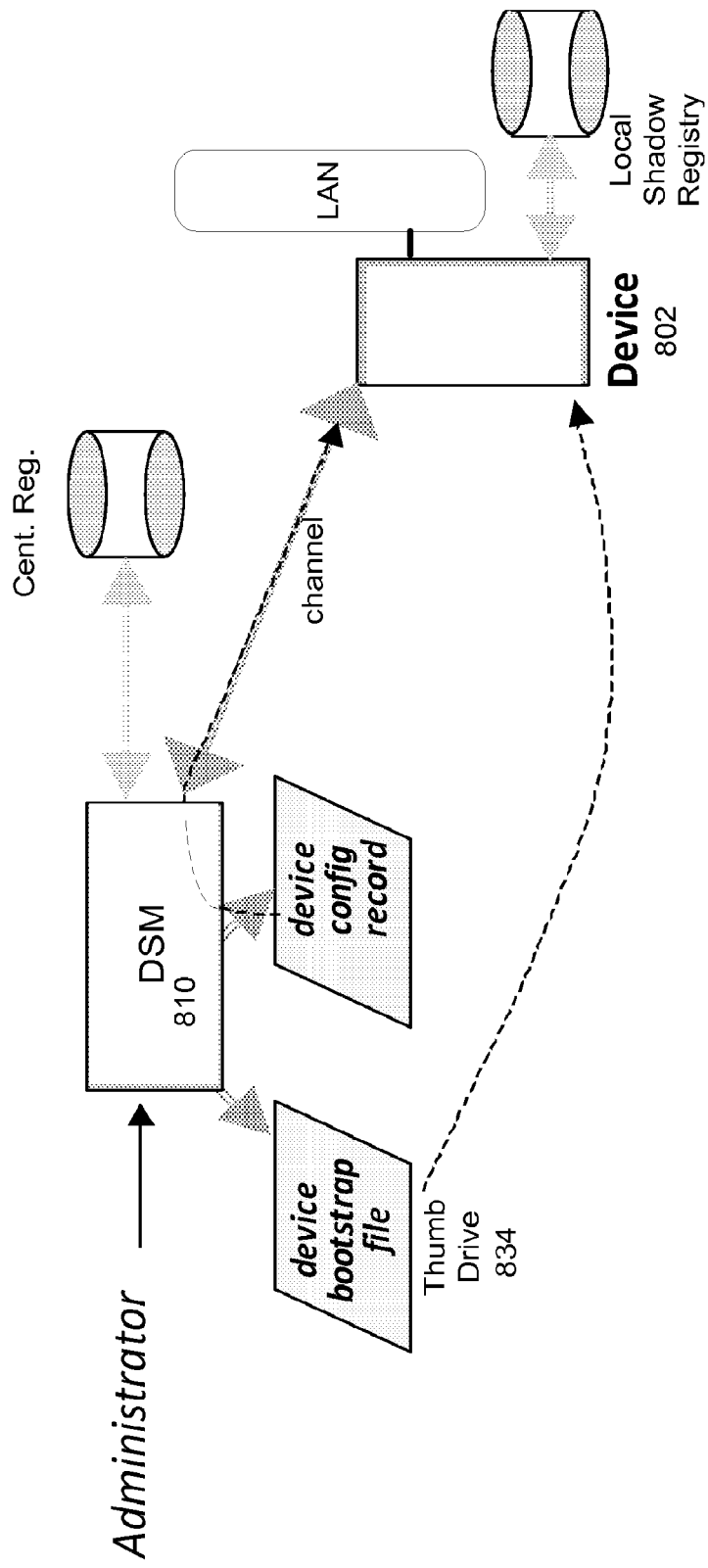
FIG. 8 illustrates a block diagram of an embodiment of the DSM distributing configuration information to the DSCs via an executable boot up file in the DSC.

FIG. 8 illustrates a block diagram of an embodiment of the DSM distributing configuration information to the DSCs, such as a first DSC 802, via an executable boot up file uploaded via a drive port 834 in the DSC 810. An administrator of the DSM 810 creates a boot up file and embeds a copy of this executable boot up file on a thumb drive. The thumb drive loaded with the executable boot up file accompanies and is shipped with the DSC device 802. The executable boot up file in the DSC 802 is scripted with code to at least 1) determine a unique ID of that individual DSC device, 2) determine the DSC's current IP address, 3) supply the DSM's IP address on the wide area network, and 4) activate code to initiate communications with the DSM 810.

The DSC device 802 uploads the boot up file from the thumb drive via the drive port 834, uses the contents of the boot up file to automatically create the secure communication channel via SSH between the DSC 802 and the DSM 810 and connects to the DSM 810 at its IP address on the WAN. The DSC 802 then authenticates itself to the DSM 810 via the unique ID, device MAC address, and/or potentially associated DNS entry. The DSM 810 then looks up the authenticating information in a reference table maintained in the DSM 810.

In an embodiment, the configuration of individual DSCs occurs by a user at the remote location of the DSC, merely inserting the appropriate portable computer readable medium, such as a thumb Universal Serial Bus (USB) Flash device, containing the boot up file with the initial configuration setting for the DSC into the USB slot on that device, applying power the unit, and waiting for the DSC LED to go green, indicating that it has successfully booted. The user then pushes the FLASH button, which causes the DSC to read the boot up file from the USB Flash device and attempt to contact the DSM. Once the DSC has successfully done so, the DSM LED shall also go green to indicate successful connection. As will be discussed in more detail later, if there is additional configuration information to download, both the DSC LED and the ACTIVITY LED shall flash green, indicating progress in downloading configuration updates. Once the configuration of the DSC is complete, The DSC LED shall again go steady green, indicating that it is ready to start passing traffic.

Figure 6:
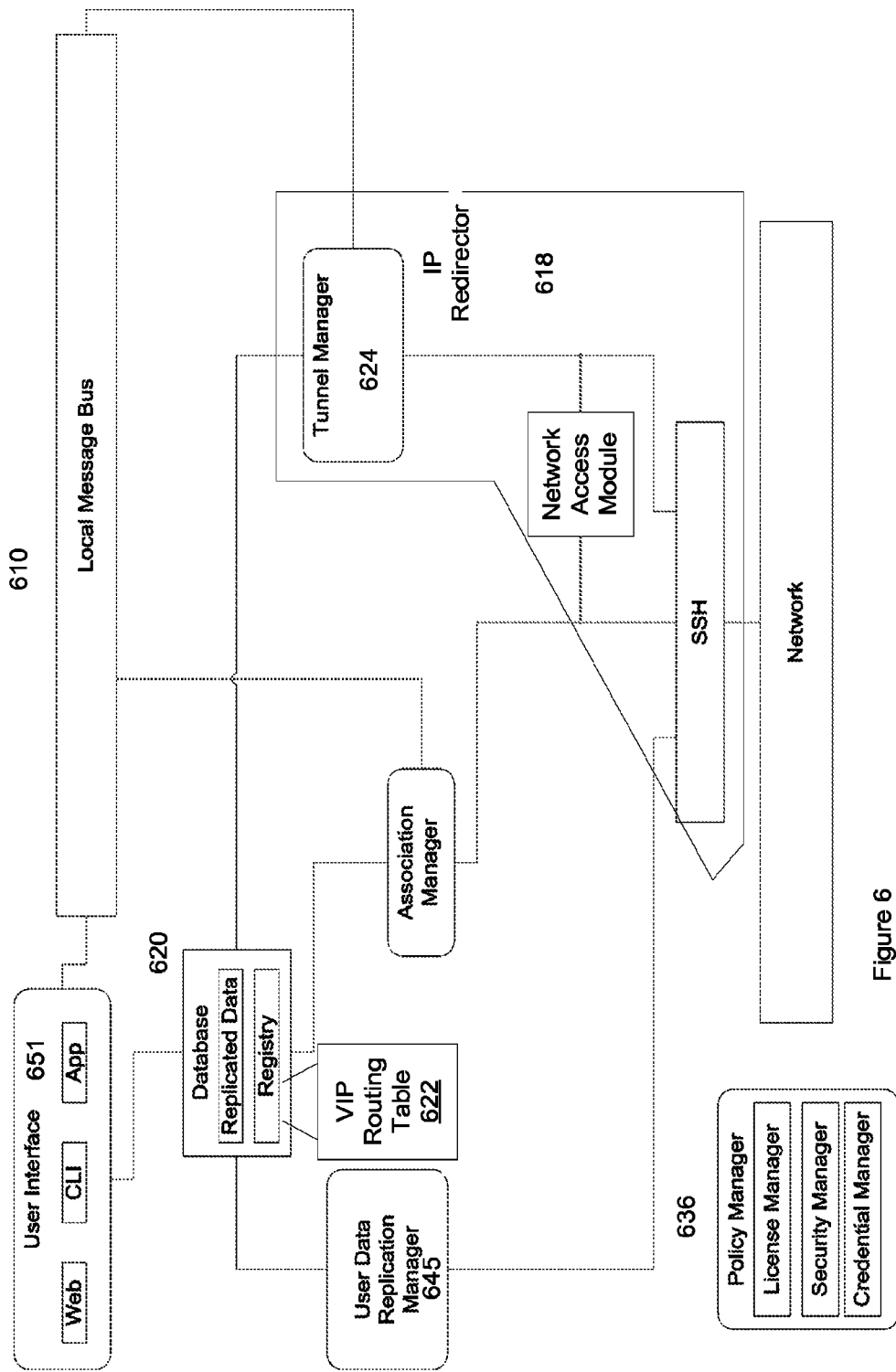
FIG. 6 illustrates a block diagram of an example embodiment of a DSM.

FIG. 6 illustrates a block diagram of an example embodiment of a DSM. The DSM 110 may contain components such as an IP redirector 618 that includes a Tunnel Manager in the DSM 610, a user interface, a database 620 that includes a registry, an association manager, a policy manager, a replication manager, and other similar components.

Figure 7:
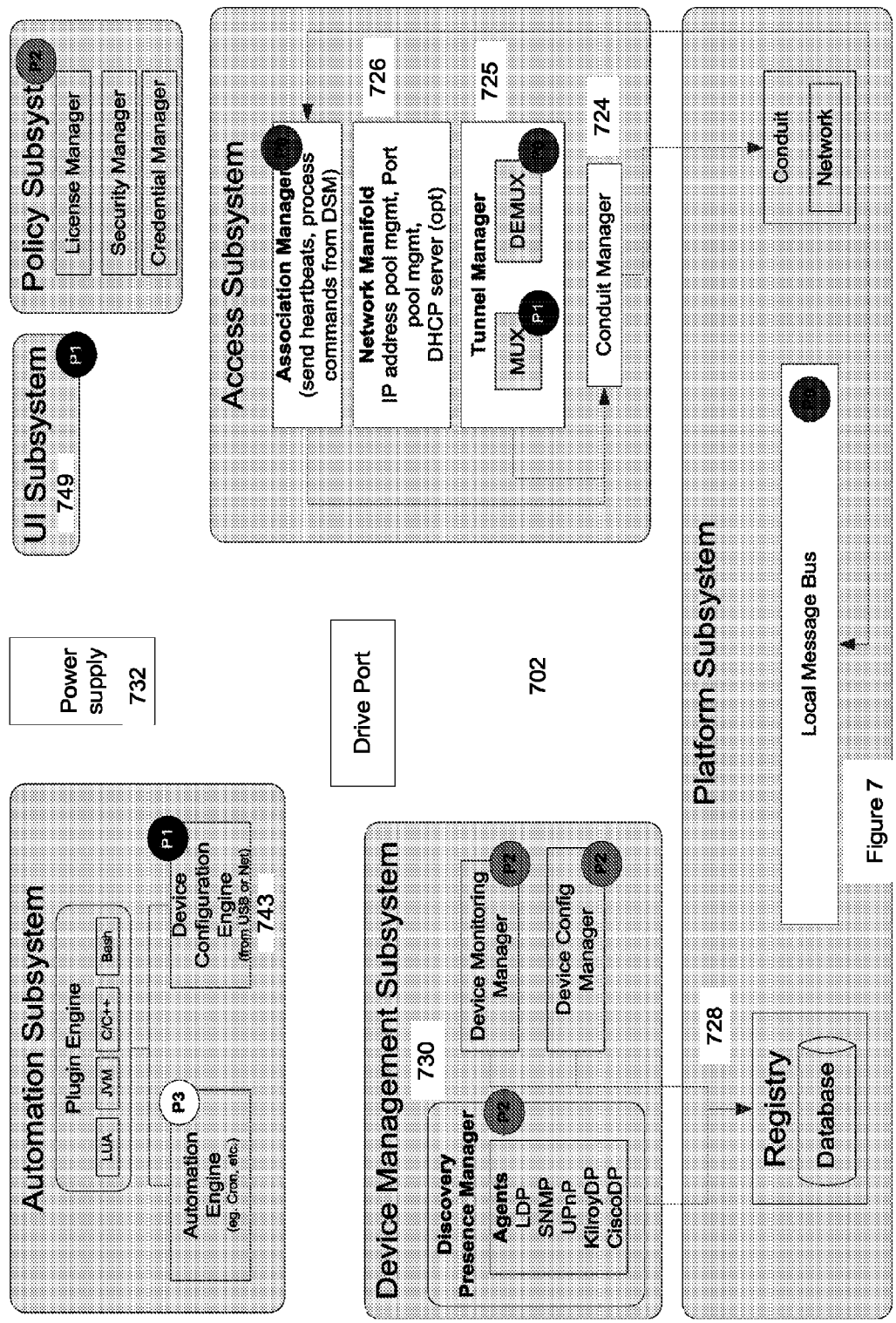
FIG. 7 illustrates a block diagram of an example embodiment of a DSC.

FIG. 7 illustrates a block diagram of an example embodiment of a DSC. The DSC 702 may contain components such as an Access Subsystem that includes the following components: an Association Manager; Conduit manager 724; a tunnel manager; and a network manifold 726. The DSC may also include a local database 728 that includes a registry, a Discovery manager 730, device configuration manager, a device monitoring manager, an automation sub system including a device configuration engine 743, a user interface, a power supply 732, a drive port 734, and other similar components.

Referring to FIG. 7, as discussed, the device configuration engine 743 in the DSC 702 without a prompt by the DSM then sends an initial configuration file with at least the unique ID of that individual DSC device and the DSC's current IP address information via a secure communication channel, such as via a secure protocol, an encrypted email, or similar method, to the DSM (with individual devices differentiated by device ID, device MAC address and/or potentially associated DNS entry).

Referring to FIG. 6, the DSM IP redirector module 618 receives this configuration information. The DSM 610 has a user data replication manager module 645 to create a device configuration/replication file with this configuration information and additional information and to make a master copy of the device configuration file in the DSM's registry 620. The user data replication manager module 645 then distributes this configuration information back out to the appropriate DSCs in response to the DSC's registering with the DSM 610 or in response to a given DSC performing a system reset. Note, the DSM 610 may also send updates of firmware, software patches, etc. in response to the boot up call.

Referring to FIG. 7, the DSC 702 may be a stand alone device deployed in an existing network. The deployment consists of merely physically plugging in the power to a power connection and power supply circuit of the DSC, plugging in the Ethernet network connection, and inserting the supplied thumb drive into a drive port 734 (i.e. USB flash drive into USB port). That is it! Thus, the DSC 702 is a stand alone device that connects up to the existing network without needing client software to be installed on another host device in that existing network and no network configuration settings are required from an end-user to properly install the DSC onto the existing network. Therefore, avoiding that many enterprise IT departments do not allow unauthorized third party applications to be installed onto their systems. The DSC 702 then resides on the existing network and mediates communication onto that LAN. No networking knowledge is necessary and access to this remote device is automatically configured. No end-user configuration or software installation is required to properly install the DSC onto the existing network.

An auto discovery presence manager program 730 resident in each DSC 702 finds networked equipment on the existing LAN and establishes an instant point of presence on that local network. The discovery presence manager program 730 discovers associated devices on the network by using a polling technique. The discovery presence manager program 730 has a Graphical User Interface (GUI) 749 to ask a user of network whether each discovered piece of network equipment protected by the firewall should be visible for remote access by at least the DSM. The DSC device 702 then collects and sends out the initial configuration file with the designated visible network device information to the central management DSM via the secure channel, which the DSM automatically registers both the local DSC and any associated network devices in the DSM-hosted Identity Registry. This information can then be made available via dynamic DNS, LDAP and DHCP, as well as associated web-based directory service application interfaces. In an embodiment, the Auto Discovery service 730 waits to discover network equipment on the existing LAN until the DSM sends back a copy of the master configuration file as well as any firmware and software updates.

The graphic user interface 749 is configured for the DSM administrator to configure Automated Device Discovery for each associated DSC. Multiple individual scan records may be created which specify either SNMPv1, SNMPv2 or another protocol as the search mechanism. When Automated Device Discovery is activated, scan records are copied to the appropriate DSC, which shall use them to initiate periodic scans of their local LAN for attached network devices.

When a device is discovered, the DSC shall create a Discovery record, which shall include as a minimum the IP address of the discovered device, the discovery protocol used to locate the discovered network device and the identifier of the discovering DSC. The resulting Discovery records shall be replicated back to the DSM for use by the DSM's Association, Configuration and Monitoring Service components. Each such Discovery record shall be assigned a unique ID, which shall allow the administrator to disambiguate references to individual configurations and discovered devices. The DSM then sends back a local copy for the DSC to store in its registry 728.

Thus, each DSC 702 of the two or more DSCs serves as a local registration authority, accepting registration requests from associated network devices on the existing local LAN, as well as polling for associated network devices on the local LAN. The DSC 702 will maintain a registry 728 of associated devices and will be able to automatically register both themselves and associated devices with its parent DSM registry. Each DSC 702 feeds this data to the parent DSM. Each DSC 702 participates in device discovery and directory service by registering associated devices discovered by using polling techniques.

Referring to FIG. 6, the DSM 610 provides centralized administration of the distributed system of DSC across the wide area network and proxy communications between those DSCs. An administrator with a GUI 651 from the DSM 610 creates a full device configuration record in Central Registry 620 from the initial configuration file with additional information including making pair associations of an existing device configuration with a specific discovered device, persistent state information, etc. The Central Configuration Registry 620 stores the configuration information and the user data replication manager makes a master copy of the device configuration file stored in the DSM 610.

The central registry 620 provides registry service for the associated DSCs and their customer network devices, and support services including dynamic Domain Name System (DNS), Lightweight Directory Access Protocol (LDAP) and Dynamic Host Configuration Protocol (DHCP).

A graphic user interface 651 of the DSM 610 is also configured for the DSM administrator to specify individual device associations, which are defined as a pairing of an existing device configuration with a specific discovered DSC device. Once a device has been associated, the DSM 610 may apply appropriate configuration changes and shall begin forwarding proxy connections to the DSC for network equipment as per a preset set of Access Rules maintained in the IP redirector module 618 in the DSM 610.

As detected DSCs are found and registered, an appropriate icon may appear in the Device Monitoring Service view of the graphic user interface 651. The user may then associate each such registered device with a previously created configured record. Once that is done, additional device settings (including'Discovery search records) can be automatically downloaded to the DSC device. Based upon these settings, the DSC will then begin discovering additional network devices and passing traffic.

The User Data Replication Manager 645 in the DSM 610 provides a mechanism for data to be replicated from a DSC to a DSM. The User Data Replication Manager 645 in the DSM 610 generates a local copy of the device configuration file including the configuration record for that DSC. The DSC uses the secured communications channel implemented in SSH to fetch the local copy of the device configuration file from the central registry 620, and then the DSC updates its locally stored copy of the device configuration file. Thus, a shadow configuration registry is maintained on the remotely managed DSC device. The DSC then signals to DSM 610 that the update is complete and the DSM 610 updates the DSC's status of remote configuration in the Central Registry 620 of the DSM 610.

The DSC periodically calls the User Data Replication Manager 645 to see if updates to configuration files, firmware etc. are downloadable. Whatever changes are needed come from the central point being the DSM. All subsequent updates are automatically copied to remote device through an automatically maintained secure communications channel.

After setup, the DSC serves as a local registration authority, accepting registration requests from associated devices on the local LAN, as well as polling for associated devices on the local LAN. The DSC maintains a registry of associated devices and has logic or software configured to automatically register both themselves and associated devices with its parent DSM central Registry 620. This information can then be made available via LDAP and Dynamic DNS, as well as associated directory service application interfaces. Also, the service provider can access authorized remote equipment without changing the network configuration or their customers' existing software. The web interface and built-in directed navigation" system provides graphical views for easy navigation and control.

In an embodiment, the DSM may also have a Discovery Entity Manager, a Device Monitor, and a Configuration Manager. The Discovery Entity Manager manages Device Entities based on entries discovered by the Presence Manager. The Device Monitor Keeps track of the state of the device. Configuration manager provides a mechanism for configuring associated network devices.

The Device Management Subsystem may include the following.

| Term | Description |
| --- | --- |
| Discovery Entity Manager | Manages Device Entities based on entries discovered by the Presence Manager |
| Device Monitor | Keeps track of the state of the device |
| Configuration Manager | Provides a mechanism for configuring Associated Devices |

As discussed, the DSM GUI interface allows the DSM administrator to configure Automated Device Discovery for each associated DSC and specify a protocol as the search mechanism. When specifying the search, the administrator provides a starting IP address and an optional ending address (indicating that the Discovery Service shall search the entire specified range). The administrator may also specify an optional port number, which if supplied will be used in place of the default protocol port. If using SNMP as the protocol, the administrator can also provide an optional community string.

The Device Entity Manager takes information from presence records, then attempts to pull more information from the device in order to determine its Id. It then populates the Entity Table with the information gathered from the presence records.

The purpose of this is to attempt to recognize devices with multiple network interfaces as a single device.

The entity table looks like this:

| Field | Description |
| --- | --- |
| Id | The Id of the device |
| Protocol | What protocol was used for the scan |
| Parent Id | Id of the parent (i.e. the DSC that found the device) |
| MAC Address | IP address of device |
| IP Address | IP address of device |
| Last Up | When this device was last found to be "up" |
| Scan Time | When this device was last scanned |

The key for this record is the combination of Id, Protocol, and Parent Id. The reason Parent Id should be there is to handle the case of devices that may be unplugged from one DSC domain and re-plugged into a new DSC domain.

The Device Monitor and Config Manager are responsible for picking the info from the latest entry.

The Device Monitor scans the Entity table and the Physical Device Configuration Attribute table and fills/updates any attributes with configuration it's able to poll (inconsistent use of poll/pull—not sure which is correct) from the device.

The configuration attributes include all settable parameters of a device: port settings, speeds, power levels, web servers, web server ports, etc.

The Physical Configuration Attribute table looks like:

| Field | Description |
| --- | --- |
| Id | The Id of the device |
| Attribute | Attribute name |
| Value | Attribute Value |
| Can Read | True if this is a value that can be read from the device. |
| Can Write | True if this is a value that can be written to the device. |
| Last Updated | When this attribute was last updated from the device. |
| Last Queried | |

The configuration manager is responsible for comparing a Virtual Configuration Attribute record with its associated Physical Configuration Attribute record.

When differences occur, it will send those configurations to the device in question. The Virtual Configuration Attribute table looks like:

| Field | Description |
| --- | --- |
| Id | The Id of the device |
| Attribute | Attribute name |
| Value | Attribute Value |
| Enable | True if this is an "active" configuration that should be sent to the device. |
| Last Pushed | When this attribute was last sent from the configuration manager. |

Referring to FIG. 7, the DSC Device Management Subsystem may consist of the following components: a Discovery Presence Manager 730, which manages Devices discovered by the Presence Agents; and multiple Discovery Presence Agents, which each agent attempts to discover associated network devices on a network using a specific protocol. (e.g. ping (ICMP), ARP, 77fe, SNMP, UPnP, etc.)

The Discovery Presence Manager 730 is responsible for the initial phase of discovery. Given parameters for a network scan (e.g. IP inclusion/exclusion ranges, scan times, network polls/sec, etc.), the Presence Manager calls a Presence Agent for each protocol in the discovery process. Presence detection results in a minimal set of information about a device. The Presence record looks something like this:

| Field | Description |
| --- | --- |
| MAC Address | IP address of device |
| Protocol | What protocol was used for the scan |
| Parent Id | Id of Parent (i.e. the DSC that found the device) |
| IP Address | IP address of device |
| Scan Time | When this device was last scanned via this protocol |
| Last Up | When this device was last found to be "up" via this protocol |

Note, the MAC address+Protocol+Parent Id should be unique.

The Discovery Presence Agents perform the actual act of detection with a specific protocol. Each agent is responsible for a specific protocol. The Platform Subsystem consists of the following components:

| Term | Description |
| --- | --- |
| Local Message Bus | A method of providing event information to all processes in a system |
| Registry | A persistent data store |
| Process Manager | Ensures the proper services are running |

The Local Message Bus may be implemented via LEBUS. This provides a simple one-way, one-to-many communication of transient events between processes on a local system.

In the DSC-DSM System, the DSM's Registry is considered authoritative. The DSC may gather new information, but that information is sent to the DSM.

OEM/VAR integration is allowed via an API into the Registry and databases are used.

To access devices on a remote network the DSC just needs to establish a single out-bound connection to the DSM controlling the VDN. Once this connection is established, all system configuration, commands and network traffic can pass through the encrypted channel. When the DSC successfully authenticates to the DSM, it can immediately begin providing secure access to individual pieces of pre-authorized equipment. The device server controller that provides DHCP-like auto-configuration for associated devices in its network.

In an alternative embodiment, the DSM GUI interface the DNA administrator saves a DSC device configuration through the web interface to a file on the browser host. Such files shall be digitally signed, to prevent unauthorized modification or alteration and may be emailed, copied across the net or onto a USB Flash memory drive. In this last case, if the USB Flash is inserted into the target DSC and the front panel pushbutton is activated, the DSC shall read the file, verify the digital signature and device settings, and if valid, apply these settings to the device. No previous connection to the DSM is required for this to work.

In addition, the DSM GUI interface the DNA administrator allows a save of a complete DSC system image through the web interface to a file on the browser host. Such files shall be digitally signed, to prevent unauthorized modification or alteration and may be emailed, copied across the net or onto a USB Flash memory drive. In this last case, if the USB Flash is inserted into the target DSC and the DSC is booted while the front panel pushbutton is held down, the DSC shall read the file, verify the digital signature and device settings, and if valid, replace the current system image with the new image. Such an image may include basic Registry settings, including a URL for the parent DSM.

Figure 2A:
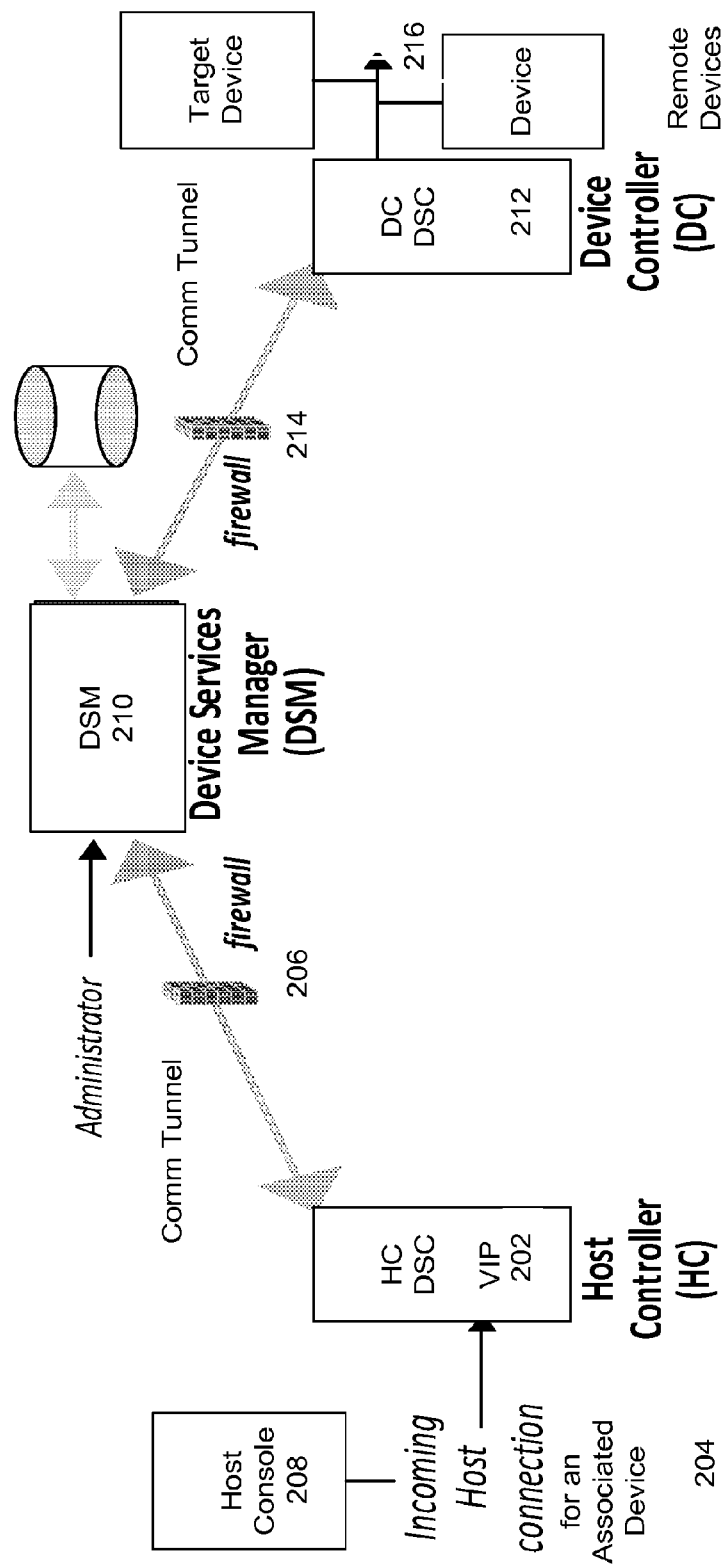
FIG. 2a illustrates a block diagram of an embodiment of system having a device service manager server located exterior to a first domain protected by a first firewall and a second domain protected by a second firewall.
Figure 2:
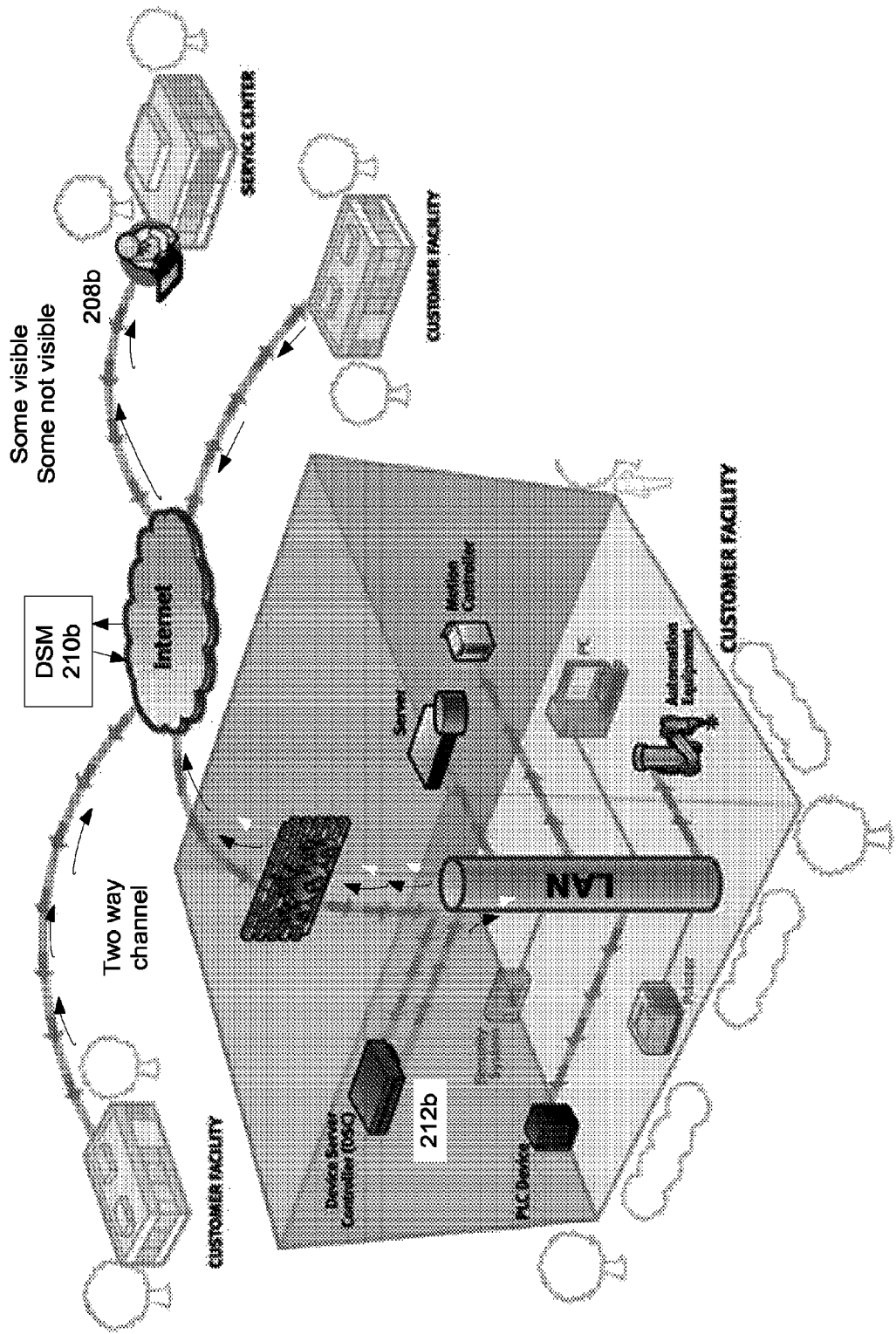
FIG. 2b illustrates a block diagram of an embodiment of a system with DSCs each having a conduit manager configured to provide a direct communication tunnel to the DSM by authenticating itself to the DSM and establishing an outgoing TCP/IP stream connection to the DSM and then keeping that connection open for future bi-directional communication on the established TCP/IP stream connection.

FIG. 2a illustrates a block diagram of an embodiment of system having a device service manager server located exterior to a first domain protected by a first firewall and a second domain protected by a second firewall.

Each DSC 202, 212, is configured with hardware logic and software to act as both 1) a Host Controller (which establishes connections for both itself and its associated devices in the first domain 204 to the DSM 210 located beyond the first firewall 206 and 2) a Device Controller (which receives and manages incoming connections from the DSM 110 to individual remote target devices in the second domain 216 protected by the second firewall 214. Note, a domain may be any network separated by a firewall or different subnets. The DSC will be able to proxy connections for both itself and its associated devices to its parent DSM located beyond the local domain. Each DSC may be configured to periodically send an outbound communication to check with the DSM to see if any pending TCP connections are waiting.

In an embodiment, the first DSC 202 and the second DSC, 212 have a Conduit Manager to provide the direct network communication tunnel to the DSM 210 by authenticating itself to the DSM 210 and establishing an outgoing TCP/IP stream connection to the DSM 210. The DSC keeps that connection open for future bi-directional communication on the outgoing TCP/IP stream connection. The established and authenticated, bi-directional communication, TCP/IP stream connection may be known as a direct network communication tunnel or conduit tunnel. The IP redirector of the DSM 210 sends routed packets down a first established TCP/IP stream connection to the first DSC 202 and sends routed packets down a second established TCP/IP stream connection to the second DSC 212. The IP redirector of the DSM 210 routes packets for a network component in the first domain 204 behind the first firewall 206 down the first established TCP/IP stream connection to the first DSC 202. The IP redirector of the DSM 210 also routes packets for a network component in the second domain 216 behind the second firewall 214 down a second established TCP/IP stream connection to the second DSC 212. Note, because TCP/IP is a bi-directional stream protocol, the DSM 210 can send routed packets down the open communication conduit tunnel and receive traffic from each DSC 202, 212.

The host console 208 and the subset of equipment in the second network form part of the VDN in which the host console 208 controls and manages the subset in second network by the second DSC 212 traversing outbound through a local firewall and/or a customer's NAT routers to access the subset of equipment on the remote network. The host console 208 establishes a single out-bound connection to the DSM 210 controlling the VDN, which allows two-way communications, and then holds that out-bound connection open. The VDN via the DSCs cooperating with the DSM 210 may create dedicated TCP/IP connections between any two points on the Internet.

FIG. 2b illustrates a block diagram of an embodiment of a system with DSCs each having a conduit manager configured to provide a direct communication tunnel to the DSM by authenticating itself to the DSM and establishing an outgoing TCP/IP stream connection to the DSM and then keeping that connection open for future bi-directional communication on the established TCP/IP stream connection. A host console 208b connects to a remote DSC 212b via a local DSC and the DSM 210b. The local and the remote DSC 212b can both hold open a direct communication tunnel between themselves and the DSM 210b for bi-directional communications. The direct TCP communication tunnel is a two-way TCP/IP stream connection/TCP session that is held opened to the DSM 210b. The traffic on the incoming connection is then relayed through that session. The Conduit Manager in the remote DSC 212b may use a certificate-based SSH (Secure Shell) encryption protocol to ensure secure, end-to-end communication between the host console 208b and the destination target device, such as a Motion Controller, via the direct TCP communication tunnel. After the traffic has been communicated, then the TCP session may then be closed. Thus, the direct TCP communication tunnel may be implemented via SSH.

In an embodiment, the direct TCP communication tunnel can also be a simple TCP port forwarder. The program is just listening to a local TCP port and all the received data will get sent to a remote host, the DSM. The direct TCP communication tunnel allows the user to bypass a firewall that does not allow a remote device to make inbound TCP/IP connections to your server.

The remote DSC is also de-multiplexing the traffic from the direct communication tunnel to the network components on its associated local area network by decoding the header on the traffic and forwarding that traffic onto the target network component. The TCP packet header information in general identifies both the source port originally sending the data and the target destination port receiving the packet.

Figure 3:
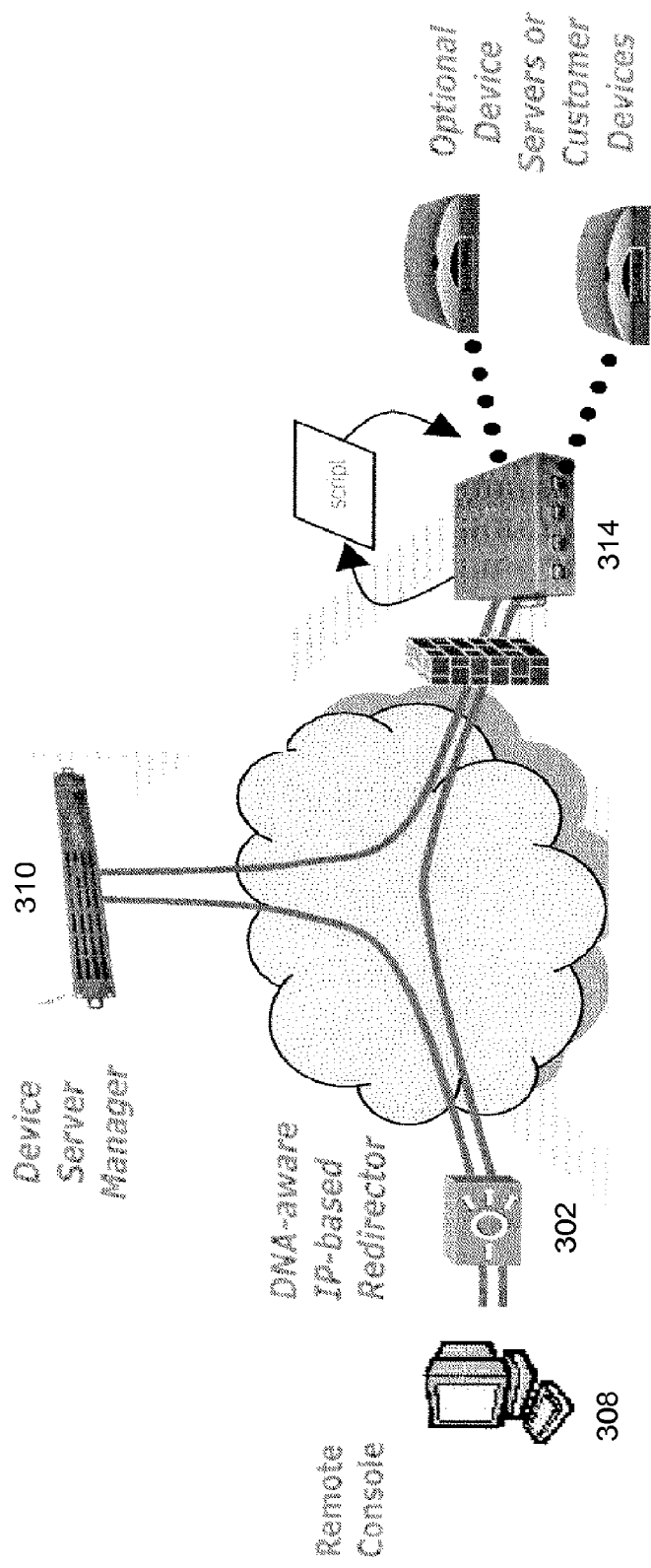
FIG. 3 illustrates a block diagram of an embodiment of a system having a central DSM and local DSCs to access to and from networked devices in networks protected by firewalls.

FIG. 3 illustrates a block diagram of an embodiment of a system having a central DSM and local DSCs to access to and from networked devices in networks protected by firewalls. The virtual device network is created by the DSM 310 and DSCs 302, 312 and the network devices associating with each DSC. The VDN in FIG. 3 operates similarly to the above descriptions for FIGS. 1, 2a, and 2b except where noted. The IP redirector may have portions resident in both the DSC and the DSM.

Referring to FIG. 7, the IP redirector may include the access subsystem device management system and registry. The Conduit Manager 724 in the DSC notifies local DSC processes that the SSH session to the DSM has been fully established. The conduit's SSH shell session is attached to the IP redirector program portion in the DSM. The IP redirector program then sends periodic beacon packets that the DSC can use to ensure the direct communication tunnel is established and active. Some minor protocol capabilities may be present to allow the DSC/DSM 110 to perform bandwidth/latency estimates. SSH's TCP port-forwarding feature can be used to pass all other control and tunnel data between the DSM and DSC. The Conduit Manager 724 may also negotiate the "remote" port it can listen on from the DSM.

Figure 4:
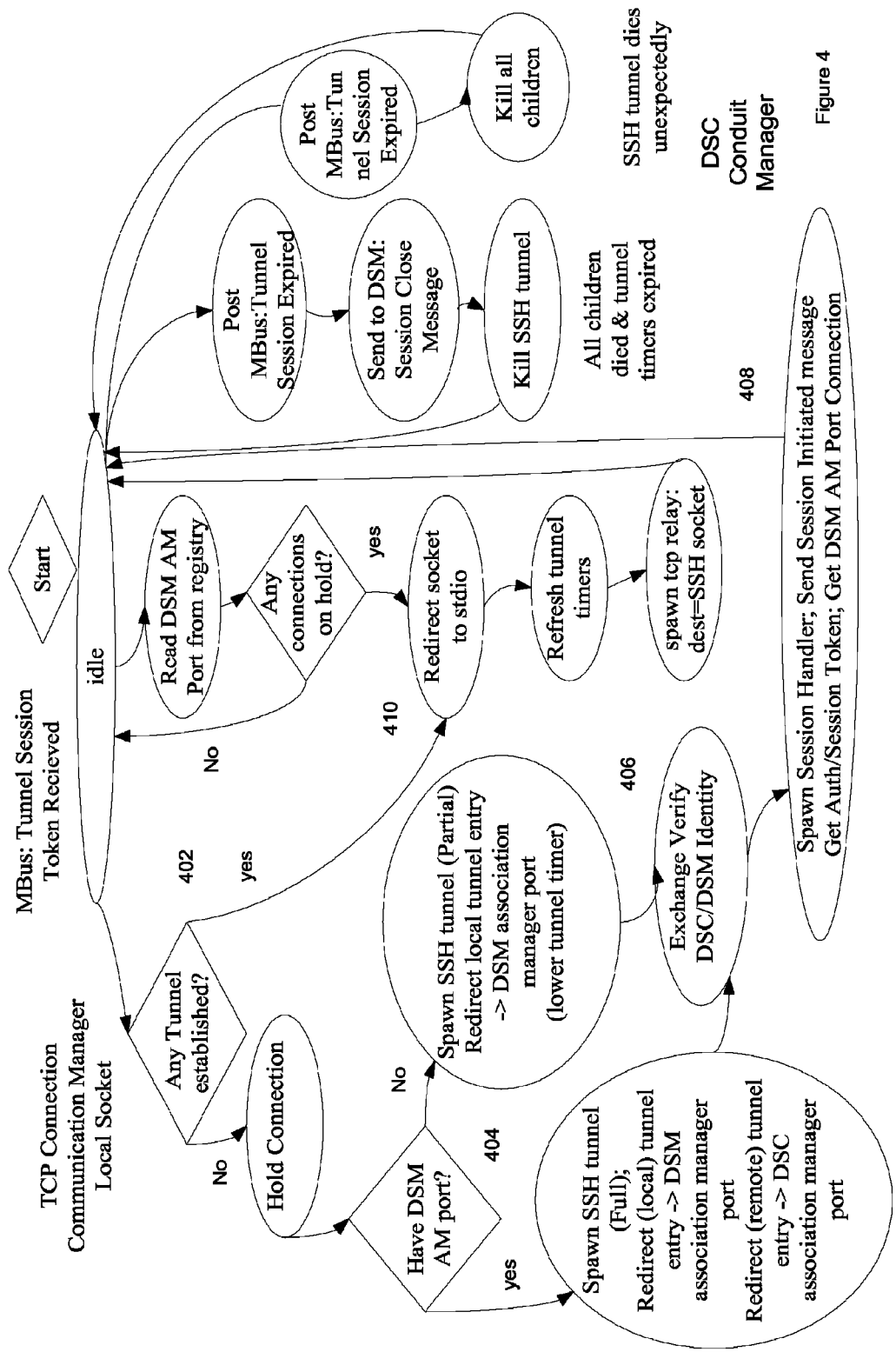
FIG. 4 illustrates a state diagram of an embodiment of the Conduit Manager in the DSC.

FIG. 4 illustrates a state diagram of an embodiment of the Conduit Manager in the DSC. The Conduit Manager contains code to start and stop the direct TCP communication tunnel, determine when this direct TCP communication tunnel is idle or unexpectedly interrupted, etc. In block 402, when a pending TCP connection request comes in, the Conduit manager checks to see if any SSH tunnel is already established with the DSM. If not, in block 404, the Conduit manager establishes a full or partial SSH session. In block 406, the Conduit manager negotiates authentication of that DSC with the DSM by each verifying their identity.

After the SSH session has been fully established and an identity of the DSC responsible for the point of origin is authenticated with the DSM, then in block 408 traffic is allowed to pass in both directions in the direct communication tunnel.

In block 410, if the tunnel has already been established, the DSC redirects the socket and refreshes the tunnel timer.

Referring to FIG. 6, the DSM 610 has an IP redirector program that consists of multiple routines implemented in software, logic or a combination of both. The DSC may also contain a portion of the IP redirector program. The IP redirector program may include portions in the DSC such as the Conduit Manager in the DSC, which has code scripted to provide basic secured network communication and manage the conduit tunnel between a DSC and the DSM and the Tunnel Manager in the DSC.

The Tunnel Manager 624 portion of the IP redirector in the DSM 610 has code scripted to provide a secured multiplexed TCP session between the DSM and a DSC operating in Demux mode and the DSM and a DSC operating in Mux mode.

The above processes may be implemented by software code written in a given programming language, hardware logic components and other electrical circuits, or some combination of both.

Accordingly, in an embodiment, the software used to facilitate the algorithms discussed above can be embodied onto a machine-readable medium. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; Digital VideoDisc (DVD's), EPROMs, EEPROMs, FLASH memory, magnetic or optical cards, or any type of media suitable for storing electronic instructions.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages. Also, an algorithm may be implemented with lines of code in software, configured logic gates in software, or a combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

In an embodiment, the logic consists of electronic circuits that follow the rules of Boolean Logic, software that contain patterns of instructions, or any combination of both.

While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. The invention is to be understood as not limited by the specific embodiments described herein, but only by scope of the appended claims.

We claim:

1. An apparatus, comprising:
a device service manager server (DSM) having an IP redirector module configured to coordinate network device communication between at least a first and second device service controllers (DSCs) behind respective firewalls, and that each have a management module to manage an access module to proxy communications for networked devices behind a firewall on a wide area network relative to a location of the DSM on the wide area network, where the DSM serves as a central management station for a distribution of configuration information to the DSCs, wherein an a priori installed executable boot up file in the first DSC is scripted with code to provide a unique ID of the first DSC, to determine a current IP address of the first DSC, to supply a DSM IP address on the wide area network of the DSM, and to activate code to initiate communications with the DSM, wherein a device configuration engine in the first DSC without a prompt by the DSM then sends an initial configuration file with at least the unique ID of the first DSC and the first DSC's current IP address information via a secure communication channel to the supplied DSM IP address of the DSM, and the IP redirector module receives this configuration information, cooperates with a user data replication manager module in the DSM to create a new device configuration file with the initial configuration information and additional information for the first DSC and then makes a master copy of the device configuration file in a registry of the DSM.

2. The apparatus of claim 1, wherein a copy of the executable boot up file is embedded in a thumb drive with the executable boot up file scripted to request no network configuration settings from an end-user to properly install the DSC onto an existing network, where the thumb drive accompanies the DSC device and the DSC is a standalone device further including a power connection and a network connection, which is deployed in the existing network by merely physically plugging in power to the power connection, plugging in the network connection to the existing network, and inserting the supplied thumb drive into a drive port.

3. The apparatus of claim 2, wherein the DSC uploads the boot up file from the thumb drive via the drive port, uses contents of the executable boot up file to establish the secure communication channel, implemented via Secure Shell, between the DSC and the DSM, connects to the DSM using the IP address of the DSM on a WAN implemented via the Internet, and then authenticates itself via the unique ID to the DSM, wherein the DSM then looks up the unique ID in a reference table maintained in the DSM.

4. The apparatus of claim 1, wherein the user data replication manager module distributes the device configuration file back out across the wide area network to the first DSC in response to the first DSC's registering with the registry in the DSM and also in response to the first DSC performing a system reset.

5. The apparatus of claim 1, further comprising:
an auto discovery service resident in each DSC configured to find networked equipment on a local network, and the auto discovery service is configured to discover associated network devices on the local network by using a polling technique, wherein the DSC has a Graphical User Interface (GUI) to ask whether each discovered piece of network equipment protected by the firewall should be visible for remote access by at least the DSM, and then the DSC device collects and sends out the initial configuration file with the designated visible network device information to the DSM via the secure communication channel, which the DSM automatically registers both the DSC and any associated network devices in the DSM-hosted Identity Registry.

6. The apparatus of claim 1, further comprising:
a graphic user interface of the DSM to configure an automated device discovery service for each associated DSC, which creates multiple individual scan records that specify a specific protocol as a search mechanism, wherein when the automated device discovery service is activated, scan records for the first DSC are copied to the first DSC, which uses the scan records to initiate periodic scans of the first DSC's local LAN for attached network devices.

7. The apparatus of claim 6, further comprising:
a discovery record created by the first DSC for each network device discovered by the first DSC, and the discovery record includes at least an IP address of the discovered device, a discovery protocol used to locate the discovered network device, and an identifier of the first DSC; wherein resulting discovery records are replicated back to the DSM for use by the DSM.

8. The apparatus of claim 5, wherein a graphic user interface of the DSM creates a full device configuration record in the registry from the initial configuration file with additional information including making pair associations of an existing device configuration with a specific discovered device and a master copy of the device configuration file is stored in the DSM.

9. The apparatus of claim 1, wherein the DSM provides registry service for each associated DSC and network devices connected to each DSC, and support services including dynamic Domain Name System (DNS), Lightweight Directory Access Protocol (LDAP) and Dynamic Host Configuration Protocol (DHCP).

10. The apparatus of claim 1, further comprising:
a graphic user interface of the DSM configured to specify individual device associations, which are defined as a pairing of an existing device configuration with a specific discovered DSC device, wherein once a device has been associated, the DSM applies configuration changes and begins forwarding proxy connections to the DSC for network equipment following a preset set of Access Rules maintained in the DSM.

11. The apparatus of claim 8, further comprising:
a data replication manager in the DSM generates a local copy of the device configuration file from the master copy and then sends the local copy to the DSC for use and storage in the DSC.

12. The apparatus of claim 11, wherein the DSC uses the secured communications channel implemented in Secure Shell to fetch the local copy of the device configuration file from the DSM, and then the DSC updates a locally stored copy of the device configuration file, where the DSC then signals to DSM that the updated locally store copy is complete and the DSM updates the DSC's status of remote configuration in the registry of the DSM.

13. The apparatus of claim 1, wherein the DSM provides centralized administration of a distributed system of DSCs across the wide area network and proxy communications between those DSCs, where each DSC of the two or more DSCs serves as a local registration authority, accepting registration requests from associated network devices on a local network, as well as polling for associated network devices on a LAN.

14. An apparatus, comprising:
a device service controller (DSC) having a power connection, a network connection, a port for a portable computer readable medium, code resident in the DSC to read configuration information in the portable computer readable medium with an executable boot up file when prompted, and an access module to proxy communications between networked devices behind a firewall and on a local area network with the DSC and remote networked devices behind a remote firewall and on a remote local area network having a second DSC, wherein the executable boot up file in the DSC is scripted to at least include device configuration information to determine a unique ID of the DSC, determine the DSC's current IP address, supply the a DSM IP address of a device service manager server (DSM) on a wide area network, and code to initiate communications with the DSM, and where the DSC uploads the executable boot up file from the portable computer readable medium, uses contents of the boot up file to establish a secure communication Secure Shell channel between the DSC and the DSM, connects to the DSM at DSM IP address on the wide area network, the DSC authenticates itself to the DSM, and then the DSM distributes a device configuration file to be locally used by the DSC to coordinate proxy communications among the local and remote networked devices based on the device configuration information supplied from the DSC to the DSM.

15. The apparatus of claim 14, further comprising:
a device configuration engine in the DSC configured to without a prompt by the DSM to send the device configuration information in an initial configuration file with at least the unique ID of the DSC device and the DSC's current IP address information via the secure communication channel to the DSM, and an IP redirector module receives this configuration information in the DSM, wherein DSM also has a user data replication manager module to create the device configuration file with the supplied device configuration information and additional information and then to make a master copy of the device configuration file in the DSM's registry.

16. The apparatus of claim 15, wherein the DSC has a module configured to serve as a local registration authority accepting registration requests from associated network devices on a local network, the user data replication manager module distributes the device configuration file back out across the wide area network to the first DSCs in response to the first DSC's registering with the DSM and also in response to a given DSC performing a system reset, and the portable computer readable medium is a Universal Service Bus drive.

17. A method for administration of a distributed system of remote device controllers across a wide area network and proxy communications between those remote device controllers, comprising:
cooperating a central management station with two or more remote device controllers behind respective firewalls in the distributed system of remote device controllers, where a first remote device controller of the two or more remote device controllers proxies network device communications with other another device controller through the central management station for networked devices behind the respective firewalls on the wide area network relative to a location of the central management station on the wide area network;
distributing configuration information to the first remote device controller via a portable computer readable medium;
reading, by the first device controller, configuration information in the portable computer readable medium with an executable boot up file when prompted;
determining, by the first device controller, device configuration information including a current IP address of the first remote device controller and other information unique to the first remote device controller, and central management station IP address;
initiating a secure communication channel with the central management station IP address supplied in the configuration information in the portable computer readable medium;
creating the secure communication channel with the central management station via opening an outward bound bi-directional connection from the first remote controller through its firewall with the central management station;
sending an initial configuration file with at least the first remote device controller's current IP address and other information unique to the first remote device controller via the secure communication channel to the central management station;
receiving, by the central management station, this configuration information and creating a new device configuration file with the configuration information and additional information and then making a master copy of the device configuration file in the central management station's registry;
generating a local copy of the device configuration file from the master copy; and
distributing the local copy to the first remote device controller for use and storage in the first remote device controller.

18. The method of claim 17, further comprising:
deploying the first remote device controller in a local network protected by the firewall by merely supplying power to the first remote device controller, plugging in a network connection of the first remote device controller to the local network, and reading the configuration information from the supplied portable computer readable medium.

19. The method of claim 17, further comprising:

accepting registration requests from associated network devices on a local network;

polling for associated network devices on a LAN;

reporting whether each polled network device should be visible for remote access by at least the central management station; and sending out the initial configuration file also including a designated visible network device information to the central management station via the secure channel, which the central management station registers both the first remote device controller and any associated network devices in the central management station's registry.

20. The method of claim 17, further comprising:

creating a full device configuration record in a central registry from the initial configuration file with additional information including making pair associations of an existing device configuration with a specific discovered device.

21. An apparatus, comprising:

a device service manager server (DSM) having an IP redirector module configured to coordinate proxy communications among network devices with first and second device service controllers (DSCs) that are behind respective firewalls on a wide area network relative to a location of the DSM on the wide area network, where the DSM serves as a central management station for a distribution of configuration information to the DSCs, wherein an executable boot up file uploaded via a drive port in the first DSC is scripted to gather configuration information for the first DSC and network devices on a network that the first DSC is on and without a prompt by the DSM then sends an initial configuration file to the DSM which makes a new master copy of a device configuration file in a registry of the DSM for the first DSC.

22. The apparatus of claim 21, wherein an executable boot up file uploaded via a drive port in the first DSC is scripted with code to at least include to determine a unique ID of the first DSC device, to determine a current IP address of the DSC, to supply an IP address on the wide area network of the DSM, to determine an IP address of any network devices on a network that the first DSC is on, and to activate code to initiate communications with the DSM, wherein a device configuration engine in the DSC without a prompt by the DSM then sends the initial configuration file with at least the unique ID of that individual DSC device and the DSC's current IP address information via a secure communication channel to the supplied IP address of the DSM, and the IP redirector module receives this configuration information, cooperates with a user data replication manager module in the DSM to create a device configuration file with the initial configuration information and additional information and then makes the master copy of the device configuration file in the DSM's registry.

* * * * *